United States Patent [19]

Shor et al.

[11] Patent Number: 5,310,778
[45] Date of Patent: May 10, 1994

[54] PROCESS FOR PREPARING INK JET INKS HAVING IMPROVED PROPERTIES

[75] Inventors: Arthur Shor, Concordville, Pa.; Harry J. Spinelli, Wilmington, Del.

[73] Assignee: E. I. du Pont de Nemours and Company, Wilmington, Del.

[21] Appl. No.: 935,049

[22] Filed: Aug. 25, 1992

[51] Int. Cl.$^5$ .............................................. C09D 11/02
[52] U.S. Cl. .................................. 524/556; 106/20 D; 106/499
[58] Field of Search ............... 106/20 D, 499; 524/556, 524/577

[56] References Cited

U.S. PATENT DOCUMENTS

| | | | |
|---|---|---|---|
| 4,148,779 | 4/1979 | Blackwell et al. | 524/321 |
| 4,597,794 | 7/1986 | Ohta et al. | 106/20 |
| 4,704,309 | 11/1987 | Coney et al. | 427/258 |
| 5,006,598 | 4/1991 | Adams et al. | 524/601 |
| 5,039,339 | 8/1991 | Phan et al. | 428/481 |
| 5,085,698 | 2/1992 | Ma et al. | 106/20 D |

FOREIGN PATENT DOCUMENTS 1301760  12/1989  Japan .............................. C09C 3/10

*Primary Examiner*—Paul Lieberman
*Assistant Examiner*—Margaret Einsmann

[57] ABSTRACT

A process for preparing aqueous pigmented ink jet inks with improved properties, comprising the steps of (a) charging a rubber two-roll milling apparatus with a pigment and a polymeric dispersant; (b) milling to obtain a dispersion of pigment with polymeric dispersant; and (c) dispersing the dispersion in an aqueous carrier medium.

17 Claims, No Drawings

PROCESS FOR PREPARING INK JET INKS HAVING IMPROVED PROPERTIES

FIELD OF THE INVENTION

This invention relates to a process for preparing aqueous ink jet inks, and more particularly to a process for preparing aqueous ink jet inks using a two-roll rubber milling apparatus.

BACKGROUND OF THE INVENTION

Ink jet printing is a non-impact method that produces droplets of ink which are deposited on a substrate such as paper or transparent film in response to a digital signal. Ink jet printers, especially thermal or bubble jet drop-on-demand printers, have found broad application as output for personal computers in the office and the home.

Thermal ink jet printers use a plurality of nozzles, each containing a resistor element, to fire ink droplets toward the print media. Nozzle openings are typically about 40–60 micrometers in diameter. For proper operation of the printer, it is imperative that the ink jet ink not clog or plug these small openings. For pigmented ink jet inks in particular, it is necessary that the pigment particles be of small enough particle size so as to not clog the ejection orifice in the nozzle. Small pigment particles are also advantageous because they are less prone to settling during storage.

Pigment particles start in an agglomerated or flocculated state. Thus, it is necessary to disperse and stabilize the pigment so as to prevent flocculation and settling. The quality of the pigment dispersivity may also affect some ink jet printing characteristics such as ejectability, print quality, optical density, etc.

Ink jet inks have been made using a variety of different dispersion processes. U.S. Pat. No. 5,026,427 teaches the use of a liquid jet interaction chamber in the preparation of pigmented ink jet inks. U.S. Pat. No. 5,085,698 teaches the preparation of aqueous pigmented inks for ink jet printers using a media mill, a ball mill, an attritor, or a liquid interaction chamber. U.S. Pat. No. 4,597,794 teaches the preparation of pigmented ink jet inks by ball mill, roll-mill, speed line mill, homomixer, sand grinder, and the like.

T. C. Patton, "Paint Flow and Pigment Dispersion", John Wiley & Sons, N.Y., N.Y., p.386 (1979) discloses that a variety of different processes can be used to disperse pigments. These include ball and pebble mills, high speed disk impellers, high speed impingement mills, three-roll mills, high speed stone and colloid mills, sand mills, and batch attritors.

The term "roll mill" as used in the ink industry, refers to a three-roll milling apparatus. See, for example, Patton at p. 388:

> The three-roll mill ... is representative of the roller mills used by the coating and ink industries to grind (disperse) pigments into vehicles. Four-roll and five-roll mills are also manufactured, but except in ink preparation this extension of the three-roll principle has not taken hold in the paint industry.

See also Nylan and Sunderland, "Modern Surface Coatings", John Wiley & Sons, N.Y., N.Y., p 529 (1979):

> The roller mills—also called roll mills—which have been most commonly used in paint grinding are triple roll mills and single roll mills, although mills with up to five rollers are available.

Two-roll mills, on the other hand, have been widely used in the rubber industry (hence the name "two-roll rubber mills") to masticate rubbers, to blend in various components (e.g. antioxidants) or to mix different types of rubbers together. Such mills typically comprise a pair of horizontally disposed, spaced-apart, parallel, stainless steel cylindrical rolls which rotate inwardly toward one another. The distance between the rolls, known as the "gap," is variable, as is the temperature and rotational speed of each roll independently.

After much research and experimentation, the present Applicants have discovered that pigmented ink jet inks prepared from dispersions made using a two-roll mill have improved properties as compared to other dispersion techniques heretofore used to prepare ink jet inks, including three-roll mills or "roll mills."

SUMMARY OF THE INVENTION

The present invention provides a process for preparing aqueous pigmented ink jet inks having improving properties, comprising:

(a) charging a two-roll milling apparatus with a pigment and a polymeric dispersant;

(b) milling to obtain a dispersion of pigment with polymeric dispersant; and (c) dispersing the pigment dispersion in an aqueous carrier medium.

In another aspect, the present invention comprises an aqueous pigmented ink jet ink made according to the above process.

DETAILED DESCRIPTION OF THE INVENTION

Aqueous pigmented ink jet inks comprise an aqueous carrier medium and a pigment dispersion. The term "pigment dispersion" as used herein means a pigment and a polymeric dispersant. The term "pigment" means an insoluble colorant which is in particulate form.

Inks made according to the process of this invention have been shown to possess remarkable improved stress life, which is a measure of the ability of the ink to maintain constant drop velocity and drop volume after many multiple firings. Inks with poor stress life will show a reduction in drop velocity or volume over time, which will result in a loss of optical density of the ink. The present process has also been found to permit the preparation of inks having a wider range of pigment to polymer ratios, or so-called "P/B ratios," which provides greater flexibility in the manufacture and formulation of ink jet inks.

PIGMENTS

A wide variety of organic and inorganic pigments, alone or in combination, are known in the art as suitable for the preparation of ink jet inks and these may be used in the present process as well. As with any pigmented ink jet ink, care must be taken to ensure that the pigment particles are small enough so as not to clog or plug the orifice of the nozzles which will be used to fire the ink. As noted above, small pigment particles also have an influence on the stability of the pigment dispersion, which is critical throughout the life of the ink. Brownian motion of minute particles will help prevent the particles from settling. It is also desirable to use small particles for maximum color strength.

The range of useful particle size is approximately 0.005 micron to 15 micron. Preferably, the pigment particle size should range from 0.005 to 5 micron, next preferably from 0.005 to 1 micron and, most preferably, from 0.005 to 0.3 micron.

The selected pigment may be used in dry or wet form. For example, pigments are usually manufactured in aqueous media and the resulting pigment is obtained as water wet presscake. Representative commercial dry pigments and water wet presscakes that may be selected to advantage are disclosed in U.S. Pat. No. 5,085,698, the disclosure of which is incorporated by reference.

Fine particles of metal or metal oxides also may be used to practice the invention. For example, metal and metal oxides are suitable for the preparation of magnetic ink jet inks. Fine particle size oxides, such as silica, alumina, titania, and the like, and finely divided metal particles, such as copper, iron, steel, aluminum and alloys, may be selected for appropriate applications.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments.

POLYMERIC DISPERSANT

Polymeric dispersants suitable for practicing the invention include any of the anionic, cationic or nonionic Polymers known in the art as suitable for use in ink jet ink preparation. Such polymers may be homopolymers, copolymers, branched polymers and grafted polymers. They may be random or block polymers. AB, BAB and ABC block interpolymers are the preferred polymeric dispersants. Most preferable are AB, BAB and ABC block interpolymers derived from at least alkyl acrylic or methacrylic acid ester and amine-substituted acrylic or methacrylic acid ester monomers.

Preferred AB and BAB block interpolymers and their process of preparation are described in U.S. Pat. No. 5,085,698, which is incorporated herein by reference. ABC block interpolymers and their methods of preparation are disclosed in U.S. Ser. No. 07/838,181 filed Feb. 20, 1992, which is incorporated herein by reference.

In ABC block interpolymers, the B segment is a hydrophobic or nonionic homopolymer or hydrophobic or nonionic random interpolymer which serves to bind with the pigment. The A block is a hydrophilic homopolymer or hydrophilic random interpolymer or salts thereof, which are solvated by the liquid media and serves to stabilize the dispersion by steric and/or ionic mechanisms. The C block is commonly an alkylated poly(oxyethylene) substituted (meth)acrylate having compatibility with common organic water-soluble co-solvents for ink jet inks and provides additional dispersion stability.

The preferred structure of the C block monomers are:

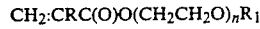

wherein R=—H or —CH$_3$; R$_1$=C$_a$H$_{2a+1}$ where a=1-4 or R$_1$=phenyl; and n=1-20. Some examples of these monomers are ethoxyethyl methacrylate, butoxyethyl methacrylate, ethoxytriethylglycol methacrylate and ethoxypolyethyleneglycol methacrylate (polyoxyethylene segment M.W.=200).

Anionic polymers useful within the scope of this invention comprise a backbone prepared from ethylenically unsaturated units and having at least one, and preferably more than three, pendant ionic moieties derived from the anionic unit on the monomer and being of the general formula:

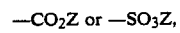

wherein Z is selected from conjugate acids of organic bases, alkali metal ions, ammonium ion, and tetraalkylammonium ions. The number of pendant ionic moieties should be sufficient to make the anionic polymer soluble in the aqueous carrier medium and will vary depending on the molecular weight of the polymer.

Useful anionic polymers include copolymers of styrene and maleic acid and their mono esters, AB block polymers wherein the A block comprises homopolymers or copolymers prepared from methyl methacrylate (MMA) or butyl methacrylate (BMA) and a B block comprises homopolymers or copolymers prepared from methacrylic acid. Particularly preferred anionic polymers are AB block polymers of BMA//BMA/MAA (5//2.5/5), MMA//MMA/MAA (10//5/7.5), and BMA//MAA (10//10), wherein a double slash indicates a separation between blocks, a single slash indicates a random copolymer, and the numerical values indicate the degree of polymerization of each monomer.

Suitable cationic polymers comprise a backbone prepared from ethylenically unsaturated units and having at least one, and preferably more than three, pendant ionic moieties derived from a cationic unit on the monomer and being of the general formula:

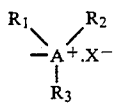

wherein A is N, P, or S; R$_1$–R$_3$ are each independently H, alkyl or alkyl ether of 1-20 carbon atoms, or aryl or alkylaryl having 1-9 carbon atoms, with the proviso that R$_3$ is not present when A is S; and wherein X is an anion selected from the group consisting of halides, conjugate bases of organic acids, and conjugate bases of inorganic acids. The number of pendant ionic moieties should be sufficient to make the cationic polymer soluble in the aqueous carrier medium and will vary depending on the molecular weight of the polymer.

Preferred cationic polymers are the phosphate salts of homopolymers or copolymers of dialkylaminoethyl methacrylate, where alkyl is methyl to butyl, and halide salts of the tetrasubstituted aminoethyl methacrylates, where the tetrasubstituted structure is derived from the reaction of a dialkylaminoethyl methacrylate with an alkylating agent such as benzyl chloride. The most preferred cationic polymer is an AB block polymer with an A block prepared from homopolymers or copolymers of methyl methacrylate (MMA) and butyl methacrylate (BMA) and a B block prepared from homopolymers or copolymers of dimethylaminoethyl methacrylate (DMAEMA) or diethylaminoethyl methacrylate. Block polymers of MMA//MMA/DMAEMA (10//5/7.5) and BMA/DMAEMA (10//10) are particularly preferred, wherein a double slash indicates a separation between blocks, a single slash indicates a random copolymer, and the numerical values indicate the degree of polymerization of each monomer.

The anionic and cationic polymers described above may be prepared in any of a number of methods well known to those of ordinary skill in the art. It is preferred that monomers containing the free acids of the ionic moieties be polymerized and the moieties converted to their salt form after the polymer structure is formed. Exemplary methods of producing such polymers include free radical solution, emulsion, suspension, bulk polymerization and the like (using a chain transfer agent, if necessary), or by stepwise polymerization processes. The graft form may be prepared by copolymerizing a preformed macromonomer or by grafting onto an existing polymeric backbone.

The AB and BAB block polymers are advantageously produced by stepwise polymerization process such as anionic or group transfer polymerization as described in U.S. Pat. No. 4,508,880, the disclosure of which is incorporated herein by reference. Polymers so produced have precisely controlled molecular weight, block sizes and very narrow molecular weight distributions. Block polymers that are selected in practicing the invention have a number average molecular weight of below 20,000, preferably below 10,000, and typically in the range of 1,000 to 3,000. Preferred block polymers have number average molecular weights in the range of 500 to 1500 for each A and B block.

The cationic polymers containing phosphonium and sulfonium moieties are preferably made by reacting a halogenated copolymer (e.g., 2-bromoethyl methacrylate) with tri-substituted phosphines (e.g., triphenylphosphine) or di-substituted sulfides (e.g., dimethylsulfide).

The amount of polymer and choice of counter ion depends on the desired structure, molecular weight and other properties of the polymer, and upon the other components of the ink composition. Salts of the polymeric dispersants can be made before or after the pigment is dispersed. The polymers can contain non-ionic, as well as ionic monomers.

The polymeric dispersant is present in the range of approximately 0.1 to 30% by weight based on the total ink composition, preferably in the range of approximately 0.1% to 8% by weight of the total ink composition. If the amount of polymer becomes too high, the ink color density will be unacceptable and it will become difficult to maintain desired ink viscosity. Dispersion stability of the pigment particles is adversely affected if insufficient polymer is present.

AQUEOUS CARRIER MEDIUM

The aqueous carrier medium comprises water (preferably deionized water) or a mixture of water and at least one water soluble organic solvent. The aqueous carrier medium is present in the range of approximately 65 to 99.5%, preferably approximately 80 to 95%, based on total weight of the ink.

Representative examples of water-soluble organic solvents are disclosed in the aforementioned U.S. Pat. No. 5,085,698, and are well known in the art. Selection of a suitable mixture of water and water soluble organic solvent(s) depends upon the requirements of the specific application, such as desired surface tension and viscosity, drying time of the ink, and the type of substrate onto which the ink will be printed.

A mixture of a water soluble organic solvent having at least one, and preferably two, hydroxyl groups and deionized water is preferred as the aqueous carrier medium. The aqueous carrier medium usually contains from about 5% to about 95% water, with the remainder (i.e., 95% to about 5%) being the water soluble organic solvent(s). The preferred ratios are approximately 60% to about 95% water, based on the total weight of the aqueous carrier medium.

OTHER INGREDIENTS

The ink may contain other ingredients well known to those skilled in the art. For example, surfactants may be used to alter surface tension as well as maximize penetration. However, they may also destabilize the pigment dispersion for pigmented inks. The choice of a specific surfactant is also highly dependent on the type of media substrate to be printed. It is expected that one skilled in the art can select the appropriate surfactant for the specific substrate to be used in printing.

In aqueous inks, the surfactants may be present in the amount of 0.01-5% and preferably 0.2-2%, based on the total weight of the ink.

Biocides may be used in the ink compositions to inhibit growth of microorganisms. Dowicides ® (Dow Chemical, Midland, Mich.), Nuosept ® (Huls America, Inc., Piscataway, N.J.), Omidines ® (Olin Corp., Cheshire, Conn.), Nopcocides ® (Henkel Corp., Ambler, Pa.) and Troysans ® (Troy Chemical Corp., Newark, N.J.) are examples of such biocides. In addition, sequestering agents such as EDTA may also be included to eliminate deleterious effects of heavy metal impurities.

Other known additives, such as humectants, viscosity modifiers and other acrylic or non-acrylic polymers may also be added to improve various properties of the ink compositions.

DISPERSION PROCESS

The process of preparing aqueous pigmented ink jet inks according to the present invention comprises the steps of: (a) charging a two-roll milling apparatus with a pigment and a polymeric dispersant; (b) milling to obtain a dispersion of pigment with polymeric dispersant; and (c) dispersing the pigment dispersion in an aqueous carrier medium.

The pigment and polymeric dispersant may be charged to the two-roll mill separately, but typically are first premixed before addition to the mill. This may be done by mixing pigment with solid polymer, or by mixing pigment with a polymer solution.

Solvents may also be added to aid in the mixing and milling process. Preferably, these solvents are low boiling solvents (i.e, a boiling point below 150° C.). The solvents can be removed by evaporation either prior to addition of the premix to the mill or during the milling process. Representative low boiling solvents that may be selected include i-propanol, ethanol, methanol, 1-propanol, 1-butanol, acetone, methyl ethyl ketone, tetrahydrofuran, toluene, ethyl acetate, butyl acetate, and water. Preferred solvents are i-propanol and tetrahydrofuran.

The amount of low boiling solvent to be used will be dependent on the mixing process. They may be used at a level of 0 to 10 times the weight of the pigment, and generally are used at a 0.5 to 4 times the weight of pigment.

Some high boiling solvents (i.e., those with a boiling point above 150° C.), or plasticizers may also be present during premix and milling. These high boiling solvent or plasticizers may be evaporated off during the milling process or they may remain in the pigment dispersion. Representative high boiling solvents and plasticizers that may be selected include ethylene glycol, diethylene glycol, polyethylene glycols, ethylene glycol monomethyl ether, ethylene glycol monoethyl ether, ethylene glycol monobutyl ether, diethylene glycol monoethyl ether, diethylene glycol monobutyl ether, ethylene glycol monoethyl ether acetate, glycerol, propylene glycol, propylene glycol monomethyl ether, propylene glycol monoethyl ether, dipropylene glycol, dipropylene glycol monomethyl ether, dipropylene glycol monethyl ether, propylene carbonate, and n-methyl-2-pyrrolidone. A preferred high boiling solvent is diethylene glycol.

The type and amount of high boiling solvent that is used is dependent on the polymer composition, P/B ratio, and mill temperatures. High boiling solvents and plasticizers are advantageously used with polymeric dispersants having a high Tg, when high P/B ratios are desired, and high mill temperatures are used. They may be used at a level of 0 to 5 times the weight of the pigment, and generally are used at a 0 to 1 times the weight of pigment.

The P/B ratio is dependent on factors such as the pigment type, pigment surface characteristics, effectiveness of the dispersant, and composition of the dispersant. The P/B ratio may range from 1/10 to 10/1 with the preferred ratio being from ½ to 3/1.

After the pigment, dispersant and optionally solvents are charged to the two-roll milling apparatus, the ingredients are milled together to form a homogeneous dispersion of pigment with polymeric dispersant. Typically one roll of the two-roll mill is held at a lower temperature that the other. The milling step may be carried out at temperatures ranging from room temperature (i.e., 25° C.) to 250° C. Preferably the temperature of the mill ranges from 25° C. to 150° C.

The gap between the rolls may remain constant during the milling step, but it is preferred that the gap be varied as the milling operation is being conducted. The particular gap range for a particular milling operation is determined experimentally and will depend upon the amount of material charged to the mill, the desired P/B ratio and the type of dispersant and/or pigment selected. In general, a gap range of 5 to 30 mils is appropriate.

The amount of time needed to form the homogeneous dispersion is dependent on the type of pigment, the P/B ratio, the polymer composition and degree of desired homogeneity in the resultant dispersion. The milling time may range from 2 minutes to 2 hours, with typical milling times ranging from 10 to 30 minutes.

INK PREPARATION

The ink compositions of the present invention are prepared from the pigment dispersion in the same manner as other ink jet ink compositions. It is generally desirable to make the ink in concentrated form, which is subsequently diluted with a suitable liquid to the appropriate concentration for use in the ink jet printing system. By dilution the ink is adjusted to the desired viscosity, color, hue, saturation density, and print area coverage for the particular application.

INK PROPERTIES

Jet velocity, separation length of the droplets, drop size and stream stability are greatly affected by the surface tension and the viscosity of the ink. Pigmented ink jet inks suitable for use with ink jet printing systems should have a surface tension in the range of about 18 dyne/cm to about 70 dyne/cm and, more preferably, in the range 30 dyne/cm to about 70 dyne/cm at 20° C. Acceptable viscosities are no greater than 20–30 cP, and preferably in the range of about 1.0 cP to about 10.0 cP at 20° C.

The ink is preferably formulated to have physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. The inks have excellent storage stability for a long period and do not clog in an ink jet apparatus. Fixing of the ink on the image recording material, such as, paper, fabric, film, etc., can be carried out quickly and easily. The printed ink images have clear color tones, high density, excellent water resistance and light fastness. Further, the ink does not corrode parts of the ink jet printing device it comes in contact with, and it is essentially odorless, and non-toxic.

EXAMPLES

Polymers used in the Examples were prepared according to the following procedures:

Polymer 1: BMA//MAA (10//10) AB Block Copolymer

A 12-liter flask was equipped with a mechanical stirrer, thermometer, $N_2$ inlet, drying tube outlet, and addition funnels. Tetrahydrofuran ("THF"), 3750 gm, and p-xylene, 7.4 gm, were charged to the flask. The catalyst, tetrabutyl ammonium m-chlorobenzoate (3.0 ml of a 1.0M solution in acetonitrile) was then added. Initiator, 1,1-bis(trimethylsiloxy)-2-methyl propene, 291.1 gm (1.25M) was injected. Feed I [tetrabutyl ammonium m-chlorobenzoate, 3.0 ml of a 1.0M solution in acetonitrile] was started and added over 150 minutes. Feed II [trimethylsilyl methacrylate, 1976 gm (12.5M)] was started at 0.0 minutes and added over 35 minutes. One hundred and eighty minutes after Feed II was completed (over 99 % of the monomers had reacted), Feed III [butyl methacrylate, 1772 gm (12.5M)] was started and added over 30 minutes.

At 400 minutes, 780 gm of dry methanol were added to the above solution and distillation was begun. During the first stage of distillation, 1300.0 gm of material with a boiling point of below 55° C. were removed from the flask. The theoretical amount of methoxytrimethylsilane (BP=54° C.) to be removed was 1144.0 gm. Distillation continued during the second stage while the boiling point increased to 76° C. During the second stage of distillation, 5100 gm of i-propanol was added. A total of 8007 gm of solvent were removed.

This made a butyl methacrylate//methacrylic acid 10//10 AB block polymer of 2400 Mn and 52.1 % solids.

Polymer 2: BMA/MAA (10/10) Random Copolymer

A 3-liter flask was equipped with a mechanical stirrer, thermometer, $N_2$ inlet, drying tube outlet, and addition funnels. THF, 760 gm, and p-xylene, 7.4 gm, were charged to the flask. The catalyst, tetrabutyl ammonium m-chlorobenzoate (1.0 ml of a 1.0M solution in acetonitrile) was then added. Initiator, 1,1-bis(trimethylsiloxy)-2-methyl propene, 58.2 gm (0.25M) was injected. Feed I [tetrabutyl ammonium m-chlorobenzoate, 2.0 ml of a 1.0M solution in acetonitrile] was started and added over 150 minutes. Feed II [trimethylsilyl methacrylate, 395.6 gm (2.5M), and butyl methacrylate, 356.3 gm (2.5M)] was started at 0.0 minutes and added over 35 minutes.

At 300 minutes, 158 gm of dry methanol were added to the above solution and distillation begun. During the first stage of distillation, 300.0 gm of material with a boiling point of below 55° C. was removed from the flask. The theoretical amount of methoxytrimethylsilane (BP=54 C) to be removed was 260.0 gm. Distillation was continued during the second stage while the boiling point increased to 76° C. During the second stage of distillation, 716 gm of i-propanol was added. A total of 1367 gms of solvent was removed.

This made a butyl methacrylate/methacrylic acid 10/10 random copolymer of 2400 Mn and 57.3% solids.

Polymer 3: BMA/MMA//MAA (10/5//10) AB Block Copolymer

A 12-liter flask was equipped with a mechanical stirrer, thermometer, $N_2$ inlet, drying tube outlet, and addition funnels. THF, 3027 gm, and p-xylene, 6.2 gm, were charged to the flask. The catalyst (tetrabutyl ammonium m-chlorobenzoate, 2.5 ml of a 1.0M solution in acetonitrile) was then added. Initiator, 1,1-bis(trimethylsiloxy)-2-methyl propene, 234.4 gm (1.01M) was injected. Feed I [tetrabutyl ammonium m-chlorobenzoate (2.5 ml of a 1.0M solution in acetonitrile)] was started and added over 150 minutes. Feed II [trimethylsilylmethacrylate, 1580 gm (10.0M)] was started at 0.0 minutes and added over 30 minutes. One hundred and twenty minutes after Feed II was completed (over 99% of the monomers had reacted), Feed III [butyl methacrylate, 1425 gm (10.0M), and methyl methacrylate, 503 gm (5.0M)] was started and added over 30 minutes.

At 320 minutes, 650 gm of dry methanol were added to the above solution and distillation was begun. During the first stage of distillation, 1250.0 gm of material with a boiling point of below 55° C. were removed from the flask. The theoretical amount of methoxytrimethylsilane (BP=54° C.) to be removed was 1144.0 gm. Distillation continued during the second stage while the boiling point increased to 76° C. During the second stage of distillation, 1182 gms of i-propanol was added. A total of 2792 gms of solvent were removed.

This made a butyl methacrylate/methyl methacrylate//methacrylic acid (BMA/MMA//MAA 10/5//10) AB block polymer of 2900 Mh and 50.5 % solids.

Polymer 4: BMA//MMA/MAA (10//5/10) AB Block Copolymer

A 3-liter flask was equipped with a mechanical stirrer, thermometer, $N_2$ inlet, drying tube outlet, and addition funnels. THF, 1160 gm, and p-xylene, 5.4 gm, were charged to the flask. The catalyst (tetrabutyl ammonium m-chlorobenzoate, 2.0 ml of a 1.0M solution in acetonitrile) was then added. Initiator (1,1-bis(trimethylsiloxy)-2-methyl propene, 99.5 gm (0.43M)) was injected. Feed I [tetrabutyl ammonium m-chlorobenzoate (2.0 ml of a 1.0M solution in acetonitrile)] was started and added over 160 minutes. Feed II [trimethylsilylmethacrylate, 643.8 gm (4.1M), and methyl methacrylate, 220 gm (2.2M)] was started at 0.0 minutes and added over 40 minutes. One hundred and fifty minutes after Feed II was completed (over 99% of the monomers had reacted), Feed III [butyl methacrylate, 570 gm (4.01M)] was started and added over 30 minutes.

At 320 minutes, 288 gm of dry methanol were added to the above solution and distillation was begun. Distillation continued while the boiling point increased to 76° C. During the second stage of distillation, i-propanol, 707 gm total, was added. A total of 962 gm of solvent were removed.

This made a butyl methacrylate//methyl methacrylate/methacrylic acid (BMA//MMA/MAA 10//5/10) AB block polymer of 2900 Mn and 45.1 % solids.

EXAMPLE 1

A black pigment dispersion was prepared by premixing 191.9 gms of Polymer 1; 200.0 gms of FW-18 black pigment (Degussa Corp., Allendale, N.J.); 135.0 gms of diethylene glycol and 450.0 gms of i-propanol. The premixture was then charged to a two-roll mill (Model XJF-S2637; Adalet Manufacturing Co., Cleveland, Ohio) and processed for 45 minutes. The temperature of one roll was held at 150° C. and the other roll was approximately 10° C. cooler. This made a pigment dispersion that contained 53.1% pigment, 26.5% polymer (P/B ratio=2/1) and 20.4% diethylene glycol.

An aqueous pigment concentrate using potassium hydroxide as the neutralizing agent was then prepared by mixing 37.66 gms of pigment dispersion prepared above with 4.62 gms of 45% KOH and 160.1 gms of deionized water with stirring. The resulting pigment concentrate contained 10% pigment and had 80 mole % of the acid groups from the polymer neutralized with potassium hydroxide.

An ink was prepared by mixing 35.0 gms of the pigment concentrate from above with 3.65 gms of diethylene glycol; 5.0 gms of Liponics ® EG-1 (Lipo Chemicals, Inc., Patterson, N.J.); 1.0 gm of Silwet ® L-77 (Union Carbide, Danbury, Conn.); 0.30 gm biocide and 56.05 gms of deionized water with stirring. This made an ink that contained 3.5% pigment and 1.75% BMA//MAA 10//10 polymeric dispersant neutralized at 80 molar % with potassium hydroxide.

Control 1

An aqueous 10% solution of neutralized AB block polymer was prepared by adding 27.83 gm of 45% KOH to a solution of 115.16 of Polymer 1 solution and 457.01 gms of deionized water and mixing until a homogeneous solution was obtained, usually 2–3 hours.

A pigment dispersion concentrate was then prepared by mixing 100.0 gms of the neutralized polymer solution with 20.0 gms of FW-18 black pigment and 80.0 gms of deionized water. This mixture was then charged to a minimill 100 (Eiger Machinery Inc., Bensenville, Ill.). Milling was carried out at 3500 RPM for an hour to give a 10% pigment dispersion at a 2/1 P/B and having a particle size of 144 nm as determined by the Brookhaven BI-90 particle sizer.

An ink containing 3.5% pigment and 1.75% polymer dispersant was then prepared by stirring together 35.0 gms of the pigment dispersion concentrate with 5.0 gms of Liponics® EG-1; 1.0 gm of Silwet L-77; 0.3 gm biocide; 5.0 gms of diethylene glycol and 53.7 gms of deionized water.

Control 2

Control 1 was repeated except that the pigment dispersion concentrate was prepared using a microfluidizer (Microfluidics Corp., Newton, Mass.) under a liquid pressure of 9,000–11,000 psi 5 times to give a 10% pigment concentrate, having a particle size of 97 nm as determined by the Brookhaven BI-90 particle sizer.

Control 3

A black pigment dispersion was prepared by premixing 168.0 gms of Polymer 1 with 175.0 gms of FW-18 black pigment; 100 gms of diethylene glycol and 600.0 gms of i-propanol. This mixture was then charged to a three-roll mill. The roll temperatures were held at 25° C. and the gap between the rolls was set at 2 mils. The mixture was processed using a 3 pass procedure. The first pass through the rolls used 0 psi pressure between the rolls. The mixture was then placed back onto the rolls and passed using 50 psi pressure. Finally the mixture was placed on the mill a third time and processed with a 100 psi pressure between the rolls. Total processing time was 1 hour.

This made a pigment dispersion that contained 18.2% pigment, 9.1% polymer (P/B=2/1), 9.1% diethylene glycol and 61.9% i-propanol.

An aqueous pigment concentrate using potassium hydroxide as the neutralizing agent was then prepared by stirring together 100.0 gms of the above pigment dispersion with 4.9 gms of 45% KOH and 85.0 gms of deionized water. This made an aqueous pigment concentrate that contained 10% pigment and had 80 mole % of the acid groups from the polymer neutralized with potassium hydroxide.

An ink was prepared by stirring 36.0 gms of the above pigment concentrate; 3.9 gms of diethylene glycol; 5.7 gms of Liponics® EG-1; 0.9 gm of n-methyl pyrrolidone and 53.5 gms of deionized water together to obtain an ink that contained 3.6% pigment and 1.8% BMA//MAA 10//10 polymer dispersant that was neutralized at 80 molar % with potassium hydroxide.

Example 2

Example 1 is repeated except that the mixture charged to the two-roll mill comprises 174.5 gms of Polymer 2; 200.0 gms of FW-18 black pigment; 135.0 gms of diethylene glycol and 450.0 gms of i-propanol.

Test Procedure

The inks prepared were loaded into pens and tested using conventional thermal ink jet testing methods. A robust ink must perform consistently throughout the life of the pen.

The following procedure was used:
a. Fill low drop volume Deskjet style pens with 45 mL of each ink.
b. Measure the initial velocity and volume of the ink droplets as they are ejected from the pen under normal printing conditions.
c. Continuously fire the pen until 20 million drops of ink are ejected from each nozzle.
d. Remeasure the velocity and volume of the ink droplets.

Results are reported in Table 1. An acceptable ink would have less than 15% drop in velocity or volume.

TABLE 1

| Example | Drop Velocity | | | Drop Volume | | |
|---|---|---|---|---|---|---|
| | Initial | Final | % Δ | Initial | Final | % Δ |
| Example 1 | 12.0 | 12.0 | 0% | 80.0 | 80.0 | 0% |
| Control 1 | 12.0 | 9.0 | −25% | 75.0 | 55.0 | −26% |
| Control 2 | 12.0 | 9.2 | −23% | 75.0 | 70.0 | −7% |
| Control 3 | 10.3 | 8.8 | −15% | 63.0 | 54.0 | −14% |

EXAMPLE 3

A black pigment dispersion was prepared by mixing together 197.2 gms of Polymer 3, 200 gms of Sunbright Y-17 yellow pigment (Sun Chemical Corp., Cincinnati, Ohio), 55.0 gms of diethylene glycol, and 135 gms of i-propanol. This mixture was then charged to a two-roll mill and processed for 25 minutes. The temperature of one roll was held at 120° C. and the other roll was approximately 10° C. cooler. This made a pigment dispersion that contained 60% pigment, 30% polymer (P/B=2/1), and 10% diethylene glycol.

An aqueous pigment concentrate using potassium hydroxide as the neutralizing agent was then prepared by mixing 33.36 gms of the pigment dispersion prepared above with 4.22 gms of 45% KOH and 162.42 gms of deionized water. This made an aqueous pigment concentrate that contained 10% pigment, having a particle size of 157 nm as determined by the Brookhaven BI-90 particle sizer, and had 90 mole % of the acid groups from the polymer neutralized with potassium hydroxide.

CONTROL 4

An aqueous 10% solution of neutralized AB block polymer was prepared by combining 118.81 gm of Polymer 3, 25.84 gm of 45% KOH and 455.35 gm of deionized water and mixing until a homogeneous solution was obtained, usually 2–3 hours.

A pigment dispersion concentrate was then prepared by 100.0 gm of the neutralized polymer solution with 20.0 gm of Sunbright Y-17 pigment and 80 gm of deionized water. This mixture was then passed through a microfluidizer (Microfluidics Corp., Newton, Mass.) under a liquid pressure of 9,000–11,000 psi 5 times to give a 10% pigment concentrate, having a particle size of 395 nm as determined by the Brookhaven BI-90 particle sizer.

Test Procedure

The pigment concentrates were diluted to 5% solids with deionized water and placed into 100 ml graduated cylinders. Observations on the status of the dispersions were noted after 1 week and 1 month. Result are reported in Table 2.

TABLE 2

| Sample No. | Particle Size | Settling Observations | | |
|---|---|---|---|---|
| | | Initial | 1 Week | 1 Month |
| Example 3 | 157 nm | None | None | None |
| Control 4 | 395 nm | None | ++ | ++ |

There was no evidence of settling in the Example 3 sample, even after one month of storage, whereas the Control 4 sample has significant amounts of pigment settling to the bottom of the cylinder after only one week. After one month, in addition to a heavy layer of pigment on the bottom of the cylinder, there was a clear layer containing no pigment in the top 15 ml of the cylinder.

EXAMPLE 4

A black pigment dispersion was prepared by mixing 315.0 gm of Polymer 4 with 150.0 gm of FW-200 black pigment (Degussa Corp., Allendale, N.J.), 75.0 gm of diethylene glycol and 75.0 gm of i-propanol. This mixture was then charged to a two-roll mill and processed for 30 minutes. The temperature of one roll was held at 148° C. and the other roll was approximately 10° C. cooler. This made a pigment dispersion that contained 49% pigment, 49% polymer (P/B=1/1), and 2% diethylene glycol.

An aqueous pigment concentrate using potassium hydroxide as the neutralizing agent was then prepared by stirring together 20.0 gm of the above pigment dispersion, 4.0 gm of 45% KOH and 66.0 gm of deionized water. This made an aqueous, pigment concentrate that contained 10.9% pigment, having a particle size of 100 nm as determined by the Brookhaven BI-90 particle sizer, and had 90 mole % of the acid groups from the polymer neutralized with potassium hydroxide.

CONTROL 5

An aqueous 10% solution of AB block polymer neutralized to the 90 mole % level with KOH was prepared by combining 133.0 gm of Polymer 4, 25.85 gm of 45% KOH and 441.15 gm of deionized water and mixing until a homogeneous solution was obtained, usually 2-3 hours.

A pigment dispersion concentrate was then prepared with 100.0 gm of neutralized polymer solution, 20.0 gm of FW-200 pigment and 80.0 gm of deionized water. This mixture was then charged to a minimill 100 (Eiger Machinery Inc., Bensenville, Ill.). Milling was carried out at 3500 RPM for one hour to give a 10% pigment dispersion at a 2/1 P/B and having a particle size of 130 nm as determined by the Brookhaven BI-90 particle sizer.

Test Procedure

To evaluate the difference in dispersion stability between dispersions made from a two-roll mill and those made from a media mill, the dispersions were added to the solvents identified in Table 3 to give a 1% pigment concentration. Dispersion stability was evaluated using the following criterion:
Dispersed Pigment particles are uniformly separated and in which Brownian motion of particles is evident
Slightly
Flocculated Pigment particles are separated but immobile (no significant evidence of Brownian motion)
Flocculated Pigment particles are highly aggregated with large voids between aggregates

TABLE 3

| Solvents | Example 4 | Control 5 |
| --- | --- | --- |
| Water | Dispersed | Dispersed |
| DEG | Dispersed | Dispersed |
| Water/TBH | Dispersed | Flocculated |
| Water/BCB | Dispersed | Flocculated |
| Water/BCS | Dispersed | Flocculated |

DEG = Diethylene glycol
Water/TBH = 80/20 water/triethyleneglycol monobutyl ether
Water/BCB = 80/20 water/butyl carbitol
Water/BCS = 80/20 water/butyl cellosolve

What is claimed is:

1. In a process for preparing aqueous pigmented ink jet inks wherein a dispersion of pigment and a polymeric dispersant is dispersed in an aqueous carrier medium, the improvement comprising:
   (a) charging a two-roll milling apparatus with a pigment and a polymeric dispersant, wherein said polymeric dispersant consists essentially of a random or block polymer having a molecular weight below 10,000 prepared from monomers selected from the group consisting essentially of substituted or unsubstituted acrylates or methacrylates and mixtures thereof;
   (b) milling to obtain a dispersion of pigment with polymeric dispersant; and
   (c) dispersing the pigment dispersions from step (b) in an aqueous carrier medium.

2. The process of claim 1, wherein the pigment and polymeric dispersant are premixed prior to step (a).

3. The process of claim 1, wherein a solvent or plasticizer is present in step (a).

4. The process of claim 3, wherein the solvent has a boiling point below 150° C.

5. The process of claim 4 wherein the solvent is present in the amount of 0–10 times the weight of the pigment.

6. The process of claim 3, wherein the solvent or plasticizer has a boiling point above 150° C.

7. The process of claim 6, wherein the solvent or plasticizer is present in the amount of 0–5 times the weight of the pigment.

8. The process of claim 1, wherein step (b) is carried out at a temperature in the range of from 25° C. to about 250° C.

9. The process of claim 8, wherein both rolls in said two-roll mill are at the same temperature.

10. The process of claim 8, wherein the rolls in said two-roll mill are at different temperatures.

11. The process of claim 1, wherein step (b) is carried out from 2 to 120 minutes.

12. The process of claim 1 or 2, wherein the pigment has a particle size of 0.005–1 micron.

13. The process of claim 1 wherein the polymeric dispersant is a block interpolymer selected from the group consisting of AB, BAB and ABC block interpolymers.

14. The process of claim 1, wherein the aqueous carrier medium is water or a mixture of water and at least one water soluble organic solvent.

15. The process of claim 14, wherein the aqueous carrier medium is present in the amount of 65–99.5% based on the total weight of the ink.

16. The process of claim 1, wherein the pigment is present in the amount of up to 30% based on the total weight of the ink.

17. The process of claim 1, wherein the polymeric dispersant is present in the amount of 0.1–30% based on the total weight of the ink.

* * * * *